United States Patent [19]
Steinbach et al.

[11] Patent Number: 5,920,891
[45] Date of Patent: Jul. 6, 1999

[54] ARCHITECTURE AND METHOD FOR CONTROLLING A CACHE MEMORY

[75] Inventors: Andy Steinbach; Scott Swanstrom; Michael Wisor, all of Austin, Tex.

[73] Assignee: Advanced Micro Devices, Inc., Sunnyvale, Calif.

[21] Appl. No.: 08/650,523

[22] Filed: May 20, 1996

[51] Int. Cl.$^6$ .............................. G06F 13/14; G06F 13/38
[52] U.S. Cl. .................. 711/146; 711/141; 711/143; 711/144; 711/145; 395/290; 395/306; 395/308; 395/309; 395/835; 395/838; 395/872
[58] Field of Search ................................ 711/143, 141, 711/144, 145, 146; 395/306, 309, 290, 308, 835, 838, 872

[56] References Cited

U.S. PATENT DOCUMENTS

| | | | |
|---|---|---|---|
| 5,155,824 | 10/1992 | Edenfield et al. | 395/470 |
| 5,195,089 | 3/1993 | Sindhu et al. | 370/235 |
| 5,197,144 | 3/1993 | Edenfield et al. | 395/470 |
| 5,226,144 | 7/1993 | Moriwaki et al. | 395/470 |
| 5,317,720 | 5/1994 | Stamm et al. | 395/470 |
| 5,325,504 | 6/1994 | Tipley | 395/455 |
| 5,353,423 | 10/1994 | Hamid et al. | 395/470 |
| 5,355,467 | 10/1994 | MacWilliams et al. | 395/473 |
| 5,359,723 | 10/1994 | Matthews et al. | 395/449 |
| 5,394,555 | 2/1995 | Hunter et al. | 395/800 |
| 5,426,765 | 6/1995 | Stevens et al. | 395/458 |
| 5,428,761 | 6/1995 | Herlihy et al. | 395/457 |
| 5,446,863 | 8/1995 | Stevens et al. | 395/427 |
| 5,528,764 | 6/1996 | Heil | 395/293 |
| 5,557,769 | 9/1996 | Bailey et al. | 711/146 |
| 5,623,628 | 4/1997 | Brayton et al. | 395/468 |
| 5,623,700 | 4/1997 | Parks et al. | 395/873 |
| 5,630,094 | 5/1997 | Hayek et al. | 395/473 |
| 5,652,846 | 7/1997 | Sides | 395/288 |
| 5,655,145 | 8/1997 | Chejlava, Jr. et al. | 395/821 |
| 5,761,725 | 6/1998 | Zeller et al. | 711/146 |

FOREIGN PATENT DOCUMENTS 0 397 995 A2  11/1990  European Pat. Off. .

OTHER PUBLICATIONS

Patent Abstracts of Japan, JP5282208, Publication Date Oct. 29, 1993.

Hennesy, John. L., and Patterson, David A., *Computer Architecture A Quantitative Approach*, 1990 Morgan Kaufman Publishers Inc., pp. 467–474.

Handy, Jim, *The Cache Memory Book*, 1993 by Academic Press, Inc., pp. 158–190.

Edenfield et al., "The 68040 On–Chip Memory Subsystem," Compcon90 Thirty–Fifth IEEE Computer Society International Conference, Feb. 26–Mar. 2, 1990, pp. 264–369.

Atkins, Mark, "Performance and the i860 Microprocessor," IEEE Micro, Oct. 11, 1991, vol. No. 5, pp. 24–27 and 72–78.

*Primary Examiner*—Tod R. Swann
*Assistant Examiner*—Denise Tran
*Attorney, Agent, or Firm*—Conley, Rose & Tayon, PC; B. Noel Kivlin

[57] ABSTRACT

A cache memory system comprising a first bus for connecting to a bus master and a second bus for connecting to a system memory. The system memory comprises a plurality of cacheable memory locations. A bus bridge provides an interface between the first bus and the second bus. A cache memory controller for caching data stored in the cacheable memory locations is connected to the system memory. The cache memory controller includes a snoop control circuit directly coupled to the first bus for snooping bus transactions upon the first bus and further coupled to the second bus for snooping bus transactions on said second bus.

15 Claims, 6 Drawing Sheets

ARCHITECTURE AND METHOD FOR CONTROLLING A CACHE MEMORY

BACKGROUND OF THE INVENTION

1. Field of the Invention

This invention relates to cache memory, and more particularly to an improved architecture and method for snooping accesses to cacheable memory initiated by an alternate bus master.

2. Description of the Relevant Art

A cache memory is a high-speed memory unit interposed in the memory hierarchy of a computer system between a relatively slow system memory and a central processing unit (CPU) to improve effective memory transfer rates and accordingly improve system performance. The name refers to the fact that the small cache memory unit is essentially hidden and appears transparent to the user, who is aware only of a larger system memory. The cache is usually implemented by semiconductor memory devices, such as static RAMs, having speeds that are comparable to the speed of the processor while the system memory utilizes a less costly, lower-speed devices, such as dynamic RAMs. The cache concept anticipates the likely reuse by the microprocessor of selected data in system memory by storing a copy of the selected data in the cache memory.

A cache memory typically includes a plurality of memory sections, wherein each memory section stores a block or a "line" of two or more words of data. A 256 Kbyte memory array cache, for example, could be divided into 8192 lines where each line consists of 32 8-bit bytes. Each line has associated with it an address tag.

When a read request originates in the processor for a new word (or a new doubleword or a new byte), whether it be data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and stored in the cache memory. The requested word is simultaneously supplied to the processor. This event is referred to as a cache read "miss".

In addition to using a cache memory to retrieve data, the processor may also write data directly to the cache memory instead of to the system memory. When the processor desires to write data to memory, an address tag comparison is made to determine whether the line into which data is to be written resides in the cache memory. If the line is present in the cache memory, the data is written directly into the line. This event is referred to as a cache write "hit". As will be explained in greater detail below, in many systems a data "dirty bit" for the line is then set. The dirty bit indicates that data stored within the line has been modified. Before a line containing dirty or modified data is deleted from the cache memory or overwritten, the modified data must be written into system memory.

If the line into which data is to be written does not exist in the cache memory, the line is either fetched into the cache memory from system memory to allow the data to be written into the cache, or the data is written directly into the system memory. This event is referred to as a cache write "miss". A line which is overwritten or copied out of the cache memory when new data is stored in the cache memory is referred to as a victim block or a victim line.

Cache memories can be optimized according to a number of different techniques. One aspect that affects system performance and design complexity is the handling of writes initiated by the processor or by an alternate bus master. As explained previously, because two copies of a particular piece of data or instruction code can exist, one in system memory and a duplicate copy in the cache memory, writes to either the system memory or the cache memory can result in an incoherence between the two storage units. For example, consider the case in which the same data is initially stored at a predetermined address in both the cache memory and the system memory. If the processor subsequently initiates a write cycle to store a new data item at the predetermined address, a cache write "hit" occurs and the processor proceeds to write the new data into the cache memory at the predetermined address. Since the data is modified in the cache memory but not in system memory, the cache memory and system memory become incoherent. Similarly, in systems with an alternate bus master, write cycles to system memory by the alternate bus master modify data in system memory but not in the cache memory. Again, the cache memory and system memory become incoherent.

An incoherence between the cache memory and system memory during processor writes can be prevented or handled by implementing one of several commonly employed techniques. In a first technique, a "write-through" cache guarantees consistency between the cache memory and system memory by writing the same data to both the cache memory and system memory. The contents of the cache memory and system memory are always identical, and thus the two storage systems are always coherent. In a second technique, a "write-back" cache handles processor writes by writing only to the cache memory and setting a "dirty" bit to indicate cache entries which have been altered by the processor. When "dirty" or altered cache entries are later replaced during a "cache replacement" cycle, the modified data is written back into system memory.

An incoherence between the cache memory and system memory during a write operation by an alternate bus master is handled somewhat differently. For a system that employs write-back caching, one of a variety of bus monitoring or "snooping" techniques may be implemented to determine whether certain lines of data within the cache memory should be invalidated or written-back to system memory when the alternate bus master attempts to write data to system memory. For one such technique as specified by the particularly popular "MESI" protocol, when an alternate bus master attempts to write data to a system memory address, a cache controller determines whether a line of data corresponding to the system memory address is contained within the cache memory. If a corresponding line is not contained by the cache memory, no additional action is taken by the cache controller, and the write cycle initiated by the alternate bus master is allowed to complete. If, on the other hand, a corresponding line of data is contained in the cache memory, the cache controller determines whether that line of data is dirty or clean. If the line is clean, the line is marked invalid by the cache controller and the transfer of data from the alternate bus master into system memory is allowed to complete. The line of data must be marked invalid since the modified (and thus the most up-to-date) data is now contained only within the system memory (following completion of the write cycle by the alternate bus master). If the line of data is instead dirty, a snoop write-back cycle is initiated by the cache controller which causes the alternate bus master to "back-off" and release mastership of the system bus. The cache controller then causes the entire line of dirty data within the cache memory to be written back into system memory. The snoop write-back cycle may be accomplished by executing a burst write cycle to system memory. As is well known to those of skill in the art, during the data phase of a burst cycle, a new word (or doubleword) may be written to the system memory for each of several successive clock cycles without intervening address phases. The fastest burst cycle (no wait states) requires two clock cycles for the first word (one clock for the address, one clock for the corresponding word), with subsequent words returned from sequential addresses on every subsequent clock cycle.

After the snoop write-back cycle completes, the alternate bus master re-obtains mastership of the system bus, and the write cycle by the alternate bus master is again executed. At this point, the new data is allowed to be written into the system memory. It is noted that the snoop write-back cycle ensures that data coherency is maintained even if the writing of data from the alternate bus master does not involve an entire cache line.

An incoherence between the cache memory and the system memory during a read operation by an alternate bus master is treated similarly. When an alternate bus master attempts to read data from system memory, the cache controller determines whether a corresponding line of data is contained within the cache memory. If a corresponding line is contained by the cache memory, and if the corresponding line is dirty, a snoop write-back cycle is initiated by the cache controller which causes the alternate bus master to back-off and release mastership of the system bus. The cache controller then causes the entire line of dirty data within the cache memory to be written back into system memory. After the write-back cycle completes, the alternate bus master re-obtains mastership of the system bus, and the read cycle by the alternate bus master is re-initiated. At this point, the data within the system memory is allowed to be read.

Figure 1:
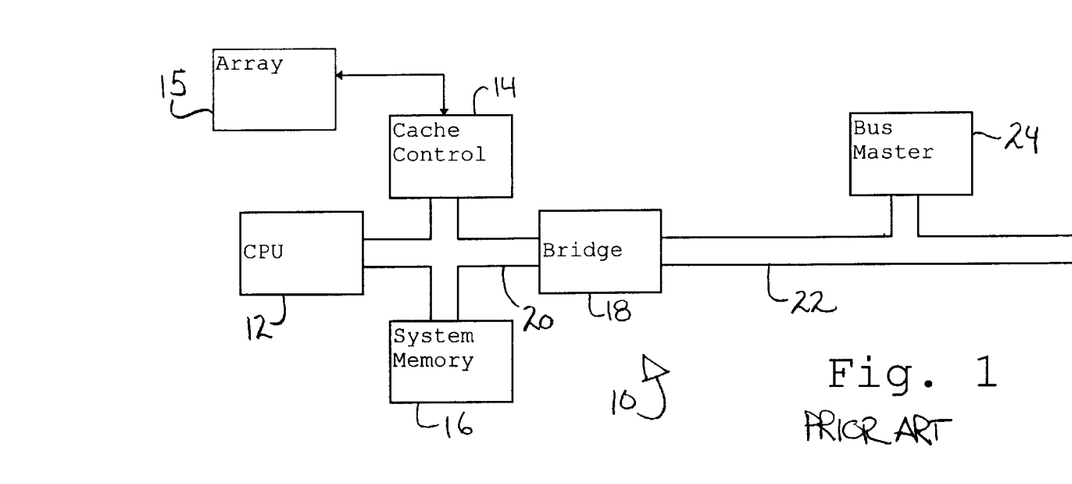
FIG. 1 is a partial block diagram of a microprocessor based computer employing a look aside cache memory topology.
Figure 2:
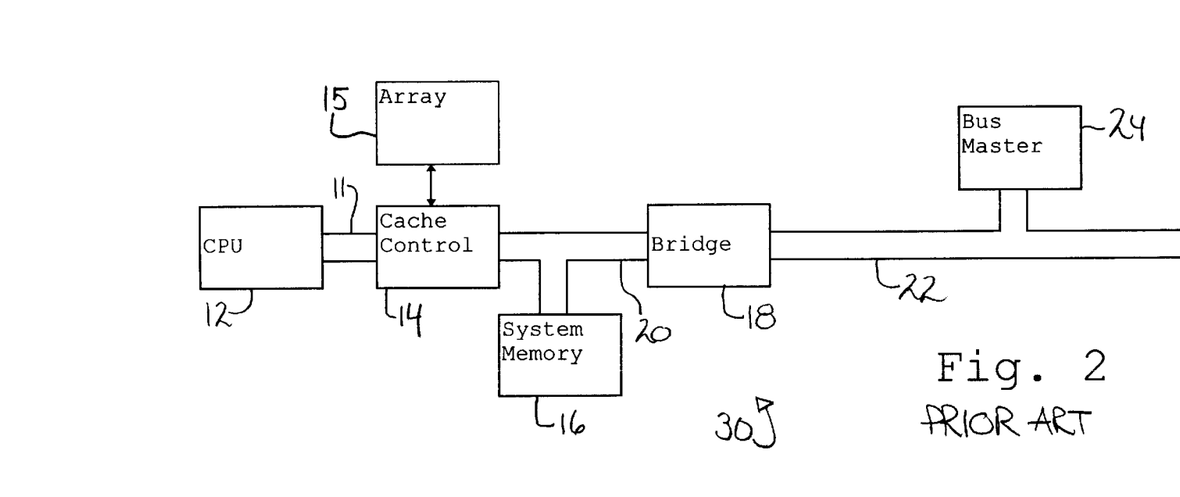
FIG. 2 is a partial block diagram of a microprocessor based computer implemented with a look through cache memory topology.

FIGS. 1 and 2 depict two common topologies used to incorporate a cache memory into a typical microprocessor based computer. In the "look-aside" cache implementation shown in FIG. 1, central processing unit (CPU) 12 is connected to cache controller 14, system memory 16, and bus bridge 18 over system bus 20. This configuration minimizes CPU-to-system memory access time when a cache miss occurs because the address arrives at cache controller 14 and system memory 16 simultaneously on the common bus. A performance penalty is imposed by the look-aside configuration, however, because CPU 12 must obtain mastership of system bus 20 to perform cache accesses. During the time that 12 has mastership of system bus 20, system memory 16 is unavailable to alternate bus master 24. Thus, bus master 24 cannot access system memory 16 while CPU 12 is performing cache accesses.

FIG. 2 shows the "look-through" cache topology. In the look-through cache system, the CPU-to-cache path is isolated from system bus 20 so that system memory 16 remains accessible by bus bridge 18 and bus master 24 during cache accesses by CPU 12. This performance gain is countered by the penalty resulting from the longer CPU-to-system memory path. With cache controller 14 placed between CPU 12 and system memory 16, more time is required to propagate a memory address from CPU 12 to system memory 16 when a cache miss occurs.

The conventional look aside and look through cache memory architectures can result in inefficient utilization of system bus 20 because bus bridge 18 is required to pass all cacheable memory accesses initiated on local bus 22 to cache controller 14 over system bus 20. This requirement prevents CPU 12 from accessing system bus 20 whenever cache controller 14 is snooping an access to cacheable memory initiated by alternate bus master 24. Stated similarly, when alternate bus master 24 initiates a memory access, bus bridge 18 acquires mastership of system bus 20 and places the memory address on the bus where the address can be snooped by cache controller 14. CPU 12 is prevented from performing operations requiring mastership of system bus 20 while bus bridge 18 has mastership of the bus. The CPU's inability to execute operations requiring system bus 20 during this time can slow the overall operation of the system.

A second component of performance degradation resulting from conventional cache architecture arises during a cache miss that requires a snoop write back cycle. When this condition occurs, the system must back alternate bus master 24 (or, more precisely, bus bridge 18, which is connected to alternate bus master 24) off system bus 20 before the cache subsystem can initiate a write back. The back off cycle can slow system performance by delaying the time required to complete the write back cycle.

A third component of degradation caused by the conventional cache architecture is the propagation delay across bus bridge 18. When a system memory access originates from alternate bus master 24 located on local bus 22, the address must propagate through the bridge logic before it arrives on system bus 20 where it can be snooped by cache controller 14. This propagation delay can lengthen local bus cycles and degrade system performance.

Finally, the conventional cache architecture greatly restricts the ability to place cacheable memory on local bus 22. Suppose, for example, that a second system memory is connected to the local bus and that an alternate bus master is trying to access an address within the second system memory. It is desirable that CPU accesses to the second system memory be cacheable. It is also desirable that alternate bus masters residing on the local bus be able to access the second system memory without acquiring mastership of the system bus. With the look-aside and look-through topologies, however, both of these desirable goals cannot typically be simultaneously accommodated. If the second system memory is made cacheable, accesses to the second system memory by an alternate bus master will necessarily require mastership of the system bus so that a coherency check to the cache can be performed. Any benefit derived from isolating the second system memory from the system bus is essentially lost if all accesses to the second system memory require mastership of the system bus.

SUMMARY OF THE INVENTION

The problems outlined above are in large part solved by an improved cache memory controller optimally interfaced to a local bus. A snoop bus comprised of a subset of the local bus is directly coupled to the cache controller, bypassing the bus bridge and the system bus, so that memory accesses initiated by an alternate bus master located on the local bus can be snooped by the cache controller without acquiring mastership of the system bus. The cache controller includes a snoop control circuit coupled to the local bus for snooping bus transactions on the local bus. By bypassing the system bus, the improved architecture enables the CPU to obtain mastership of the system bus and execute CPU operations while the cache controller snoops alternate bus master memory accesses via the snoop bus. The snoop control circuit snoops CPU bus transactions on the system bus and alternate bus master transactions on the local bus independently. That is, the snoop control circuit does not require the bus bridge to obtain mastership of the system bus to snoop transactions on the local bus.

The improved architecture eliminates the restriction encountered in conventional cache memory arrangements that the bus bridge pass all accesses to cacheable memory locations. The elimination of this restriction permits the design of systems wherein cacheable memory locations can be advantageously located on the local bus. Such cacheable memory locations can be in the form of system memory located on the local bus or addressable memory within an alternate bus master located on the local bus. The flexibility of the system is thereby substantially improved. Performance may also improve because mastership of the system bus is no longer required to snoop addresses generated by the alternate bus master.

The optimally interfaced cache controller further addresses the problems outlined above by eliminating the bus bridge propagation delay. Memory accesses originating from an alternate bus master on the local bus are snooped substantially as soon as the memory address appears on the local bus. The elimination of the bus bridge propagation delay can shorten the local bus cycle time and increase system performance. The present invention can still further address the above referenced problems by eliminating the back-off cycle required whenever a snoop write back cycle is initiated. By providing a subset of the local bus directly to the improved cache controller, the controller can initiate a write back cycle before the bus bridge has acquired mastership of the system bus thereby eliminating the need to back the bus bridge off of the system bus. The elimination of these back-off cycles can result in improved system performance.

Broadly speaking, the present invention contemplates a system for controlling a cache memory array comprising a bus bridge connected to a first bus for connecting to a bus master. In one embodiment, the first bus is a PCI bus. A second bus, for connecting to a system memory, interfaces with the first bus over a bus bridge. A cache controller is connected the system memory. The cache controller includes a snoop control circuit coupled to the first bus for snooping transactions on the first bus and coupled to the second bus for snooping transactions on the second bus.

The invention further contemplates a system for controlling a cache memory array wherein the second bus is coupled to a CPU. The first system memory array comprises a plurality of cacheable memory locations.

The invention still further contemplates a system for controlling a cache memory array wherein the first bus is connected to a second system memory array that includes a plurality of cacheable memory locations.

The invention still further contemplates a method of utilizing a cache memory array comprising a first step of accessing a cacheable memory location by a first bus master. The first bus master is connected to a bus bridge over a first bus. A second step comprises snooping the cacheable memory access by a cache controller. The cache controller is connected to the bus bridge and the first system memory by the second bus. The cache controller is connected to the first bus by a third bus such that the cache controller can snoop the first bus master's access to cacheable memory without acquiring mastership of the second bus.

The invention still further contemplates a method for controlling data coherency in a cache memory subsystem in which a CPU executes a first cycle on a first bus to access a location in system memory. The cache controller snoops the first cycle on the first bus. A bus master performs a second cycle upon a second bus. The cache controller snoops the second cycle on the second bus.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 depicts a computer system 10. System 10 includes CPU 12, cache controller 14, system memory 16, and bus bridge 18, all connected via system bus 20. Bridge 18 is further connected to local bus 22 which interfaces with an alternate bus master 24. The address associated with a memory access originating from CPU 12 arrives at cache controller 14 and system memory 16 simultaneously with the look aside topology shown in FIG. 1. This improves performance when a memory access by CPU 12 results in a cache miss because system memory 16 receives the address directly from CPU 12 thereby decreasing the time required to satisfy the memory access. On the other hand, the look aside topology can impede system performance when CPU 12 is accessing cache array 105. CPU 12 must acquire mastership of system bus 20 to complete an access to cache array 105. System bus 20 is, therefore, unavailable for other operations such as an access to system memory 16 by alternate bus master 24. If a specific application of system 10 generates frequent accesses to memory by alternate bus masters, the look aside topology can place a strain on the bandwidth limitations of system bus 20 resulting in degraded performance.

Alternatively, a look through topology shown in FIG. 2 as system 30 is sometimes employed. CPU 12 connects to cache controller 14 over CPU bus 11. In this embodiment, CPU 12 is isolated from system bus 20. System bus 20 connects cache controller 14, bridge 18, and system memory 16. With this topology, CPU 12 can execute accesses to cache array 105 over CPU bus 11 without acquiring mastership of system bus 20. As long as CPU 12 memory operations result in cache hits, system bus 20 remains available for accesses to system memory 16 by bus master 24 sitting on local bus 22. When a CPU 12 memory access results in a cache miss however, system 30 imposes a performance penalty because system memory 16 is separated from CPU 12 by cache controller 14. It will therefore take additional time for system memory 16 to satisfy the memory access because the memory address must propagate through cache controller 14.

In both the system of FIG. 1 and the system of FIG. 2, bridge 18 must pass all accesses to cacheable memory initiated on local bus 22 to cache controller 14 over system bus 20 to ensure proper snooping because cache controller 14 cannot directly snoop transactions on local bus 22. During the time that bus bridge 18 has mastership of system bus 20, CPU 12 is prohibited from accessing system bus 20. If CPU 12 requires mastership of 20 to execute an operation, system operation is temporarily suspended until bus bridge 18 relinquishes system bus 20.

If bus master 24 initiates an access to a cacheable memory location (i.e. to system memory 16), bus master 24 must obtain mastership (via bus bridge 18) of system bus 20 to pass the address of the cacheable memory location address to controller 14 for proper snooping. If a system memory access initiated by bus master 24 results in a cache hit requiring a write back, bus master 24 must then be backed off system bus 20 so that cache controller 14 can write back data to system memory 16. In addition, the address of the cacheable memory location must propagate through bridge 18 before arriving on system bus 20. The propagation delay across bus bridge 18 can slow local bus 22 cycle time and degrade performance.

Figure 3:
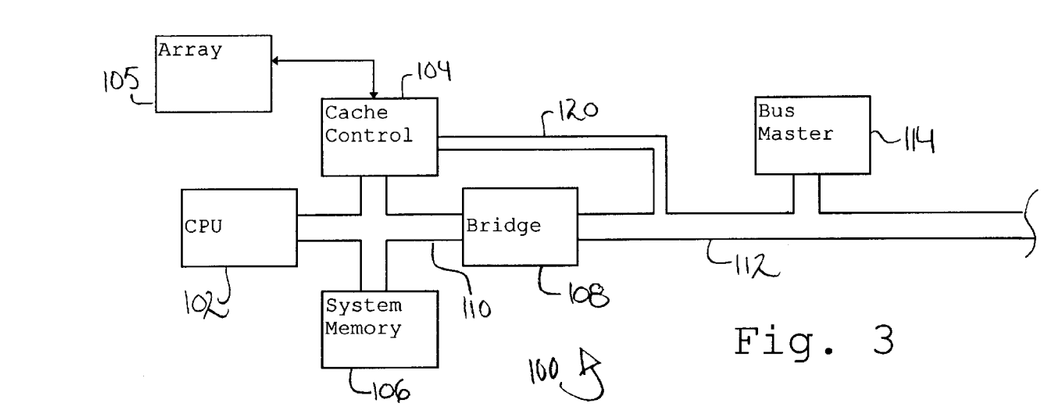
FIG. 3 is a partial block diagram of a microprocessor based computer, showing an improved bus architecture implemented in a look aside topology.

FIG. 3 shows an embodiment of an improved bus architecture for implementing a cache memory to which the present invention is adapted. System 100 includes CPU 102, cache controller 104, system memory 106, and bus bridge 108, all connected via system bus 110. System memory 106 preferably includes a memory controller. Bridge 108 is further connected to local bus 112 which interfaces with an alternate bus master 114. Snoop bus 120 routes a subset of local bus 112 directly to cache controller 104. In one embodiment, local bus 112 is a peripheral component interface (PCI) bus. Alternatively, local bus 112 could be designed in accordance with another standard such as the Video Electronics Standard Association (VESA), VL bus. CPU 102 is illustrative of, for example, an X86 microprocessor such as a 80486 microprocessor or a Pentium compatible microprocessor. It is understood, however, that the system according to the present invention may employ other types of microprocessors. It is further understood that the present invention may be employed within a multiprocessing environment. Various types of devices may serve as bus master 114. Bus master 114 could, for example, be a video capture port, a video adapter, an audio adapter, a telephony adapter, an SCSI (small computer systems interface) disk controller, or a network interface card. Typically, CPU 102 operates at a higher frequency than bus master 114. To enable CPU 102 and bus master 114 to operate at different frequencies, system bus 110 is isolated from local bus 112 by bridge 108. Cache controller 104 interfaces to cache array 105, which is comprised of a plurality of static ram devices in one embodiment.

When bus master 114 initiates an access to system memory 106, the memory address is routed to local bus 112 and snoop bus 120 simultaneously. Because snoop bus 120 bypasses bridge 108, the memory address arrives at cache controller 104 before it propagates through bus bridge 108. A comparison between the memory address and the addresses stored in cache controller 104's tag array can be made before bridge 108 acquires mastership of local bus 110. If a snoop write back cycle is required, snoop bus 120 may enable controller 104 to initiate the write back cycle before bridge 108 acquires mastership of system bus 110 thereby eliminating the need to initiate a backoff cycle. In addition, snoop bus 120 enables CPU 102 to access system memory 106 over system bus 110 while cache controller 104 snoops an access to cacheable memory initiated by bus master 114. This benefit will take an additional significance when cacheable memory locations are placed on local bus 112 as described in greater detail below.

Figure 9:
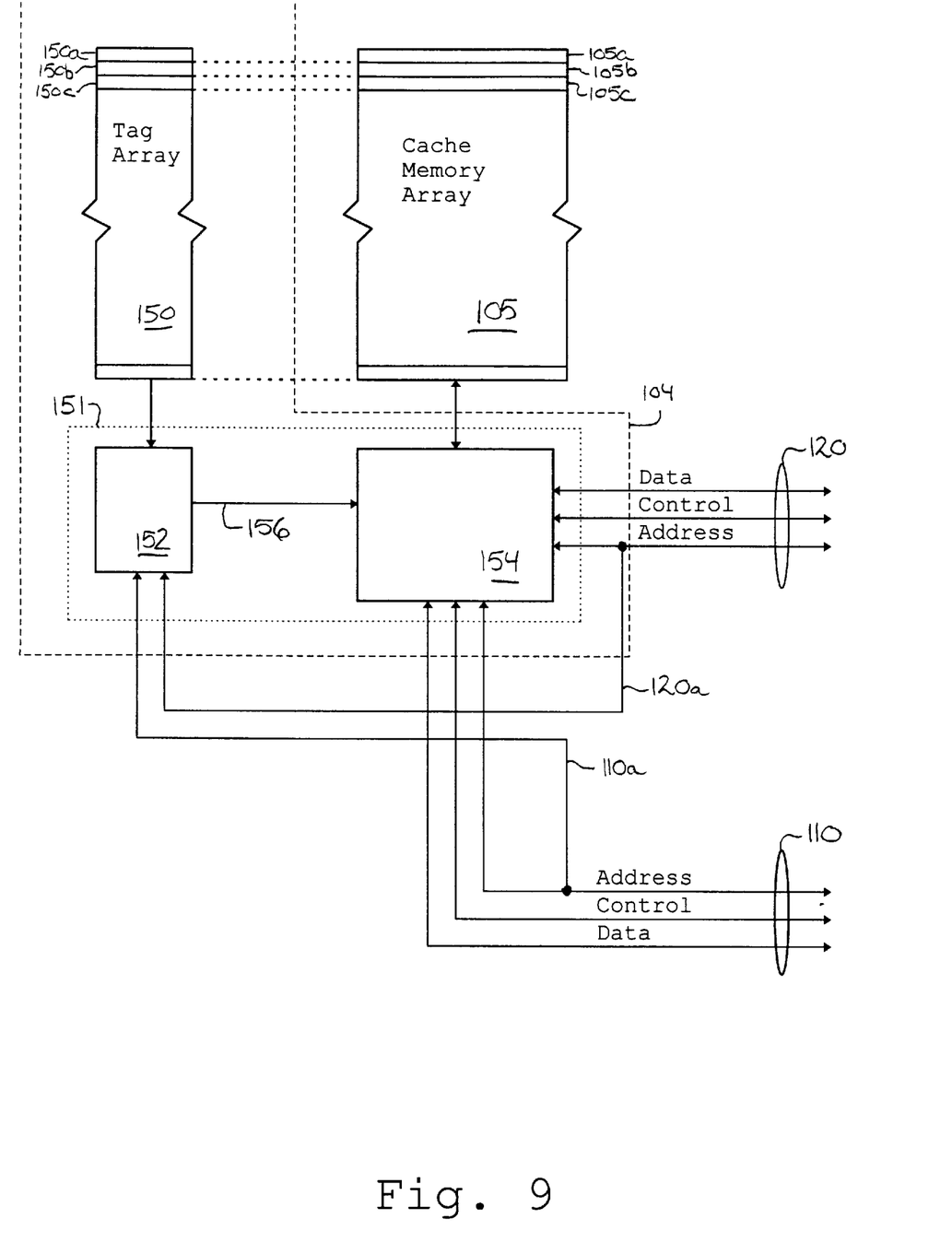
FIG. 9 is a block diagram of an improved cache controller in which the snoop bus comprises addresses, data and control lines.

FIG. 9 is a block diagram of an improved controller 104 for use in conjunction with an embodiment of the present invention. Controller 104 is interfaced to snoop bus 120, system bus 110, and cache memory array 105. Cache memory array 105 includes locations for storing a plurality of lines 105a, 105b, 105c, and so on. Each line preferably comprises a plurality of 8-bit bytes. In one embodiment, cache memory array 105 is comprised of 8,192 lines in which each line contains 32 bytes. Cache controller 104 comprises tag array 110 and snoop control circuit 151 comprised of comparator 152 and state logic 154. In the embodiment shown in FIG. 9, snoop bus 120 is a full, bi-directional bus containing data signals as well as address and control signals.

When an alternate bus master located on local bus 112 initiates an access to a cacheable memory address, the address is routed via snoop bus 120 to state logic 154 and to comparator 152. Comparator 152 compares the address on address bus 120a with the plurality of addresses in tag array 110. If comparator 152 detects a match between the address on address bus 120a and one of the plurality of addresses in tag array 110, a hit signal is generated on line 156 which is routed to state logic 154. If, on the other hand, comparator 152 detects no match between the address on address bus 120a and any of the plurality of addresses in tag array 110, comparator 152 generate a miss signal on line 156 which is routed to state logic 154. In the embodiment shown, each location within tag array 110 is associated with a line of data in cache memory array 105. For example, tag array location 110a is associated with cache memory array line 105a. If a cache hit is detected by comparator 152 and state logic 154 detects an incoherence between the data in cache array 105 and the cacheable memory location (i.e. the data dirty bit associated with the cache line is set), state logic 154 executes a write back of the data within cache array 105 to the cacheable memory location. If the cacheable memory location resides on local bus 112, such as cacheable memory 142 shown in FIG. 8 or second system memory 130 shown in FIG. 6, the data is written back to the cacheable memory over snoop bus 120. If the cacheable memory location resides in system memory 106, the data is written back to system memory 106 over system bus 110.

Figure 10:
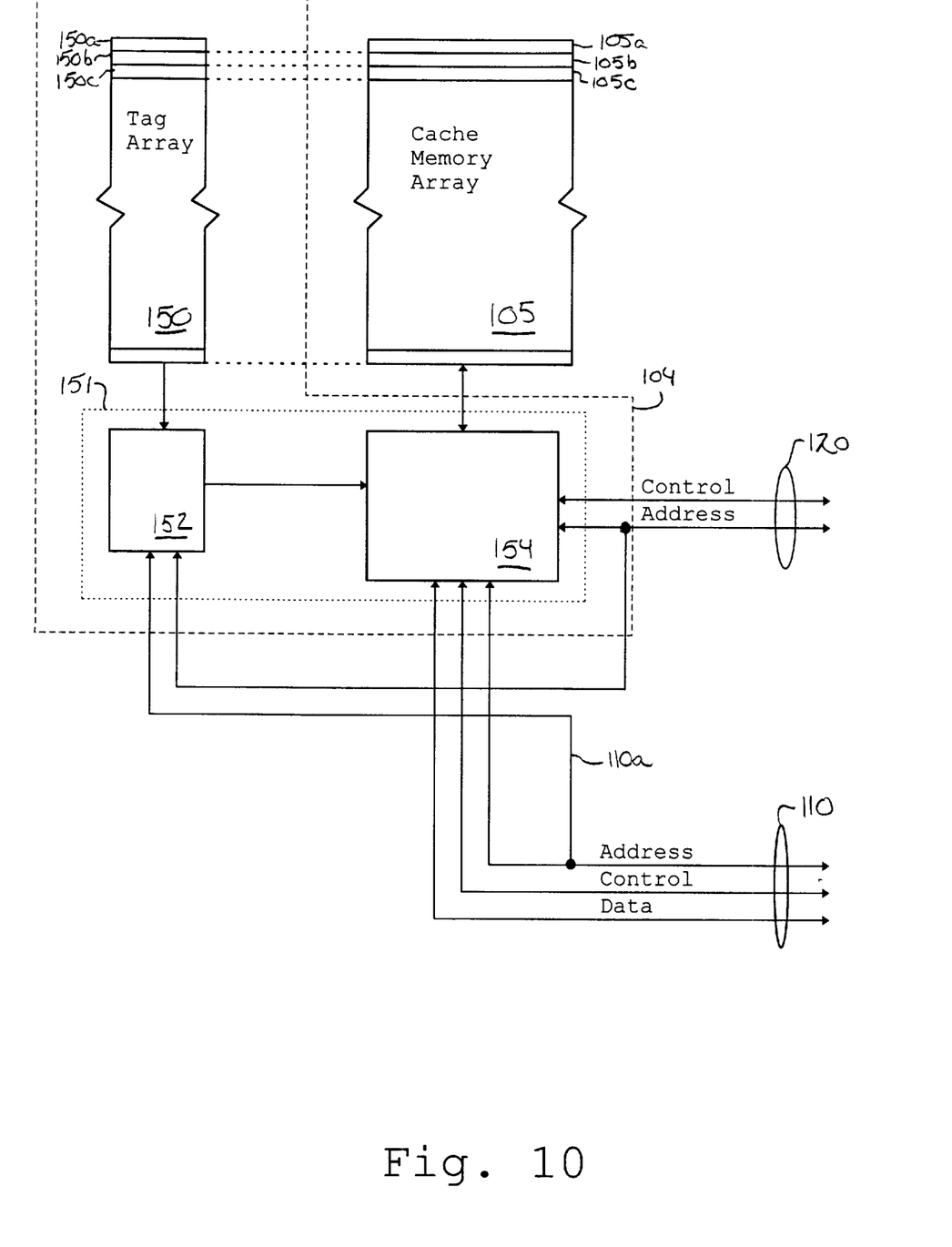
FIG. 10 is a block diagram of an improved cache controller in which the snoop bus comprises address and control lines.

Turning now to FIG. 10, an alternative embodiment of cache memory controller 104 and snoop bus 120 is shown. The embodiment of FIG. 10 features a snoop bus 120 containing fewer signals that is intended to minimize the additional circuitry and external pin count required to implement improved cache controller 104. Snoop bus 120 contains control signals and address signals routed to state logic 154. Unlike the snoop bus shown in FIG. 9, no data is routed over snoop bus 120 in the embodiment shown in FIG. 10. If a cache hit requiring a write back occurs with this embodiment, the data from cache memory array 105 must be written back to the cacheable memory location over system bus 110 whether the cacheable memory location resides in system memory 106 or in a memory attached to local bus 112. This embodiment could, nevertheless, improve usage of system bus 110 by eliminating certain back-off cycles as described in greater detail above.

Figure 4:
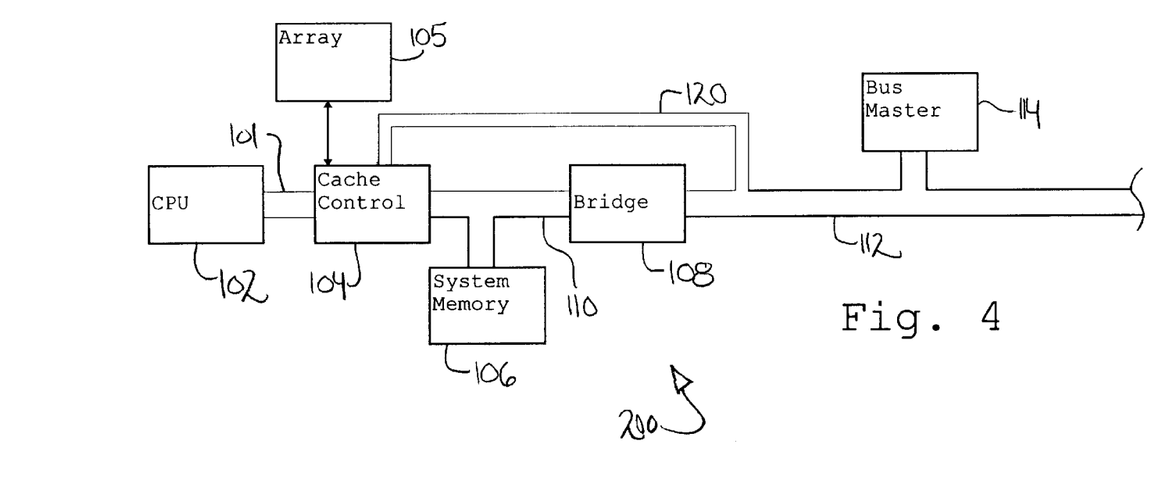
FIG. 4 is a block diagram similar to FIG. 3, showing an improved bus architecture implemented in a look through topology.

FIG. 4. shows system 200 which is similar to the system shown in FIG. 3. System 200 is implemented with the look-through architecture described above in which CPU 102 is detached from system bus 110 and connected to cache controller 104 by CPU bus 11. The remaining block elements of system 200 function in the same manner as the corresponding block elements in FIG. 3 and have been shown with identical numbering for clarity and brevity.

Figure 5:
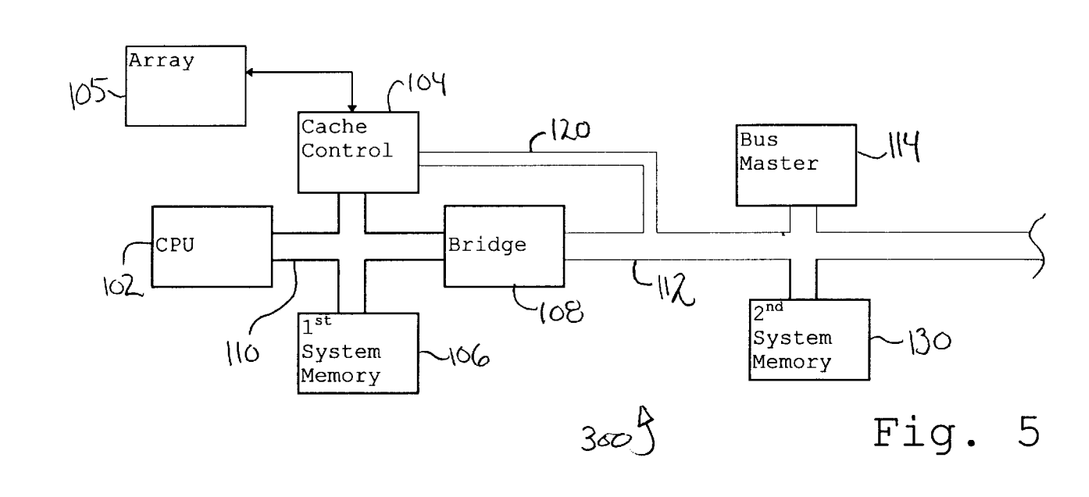
FIG. 5 is a block diagram similar to FIG. 3, further showing a bus master and a second system memory connected to the local bus.

Turning now to FIG. 5, improved cache controller 104 and snoop bus 120 enable the advantageous placement of cacheable memory locations on local bus 112 by allowing controller 104 to snoop memory accesses on multiple busses. FIG. 5 shows an embodiment of system 300 in which second system memory 130 is connected to local bus 112. The present invention permits the placement of a second system memory 130 located on local bus 112. Without a means by which cache controller 104 can directly snoop transactions on local bus 112, one of two undesirable alternatives would typically have to be chosen to accommodate the placement of second system memory 130 on local bus 112. The first alternative would be to prevent second system memory 130 from being cacheable. In such a system, performance would be degraded because all CPU accesses to second system memory 130 would be constrained by the relatively slow access time of second system memory 130 compared to the relatively fast access time of cache memory array 105. The second alternative would be to allow caching of second system memory 130 across bus bridge 108. A drawback of this implementation is that address snooping must occur over local bus 110 whenever second system memory is accessed. The present invention provides a preferable mechanism for permitting the caching of second system memory 130. If bus master 114 initiates an access to second system memory 130, the memory address is snooped by cache controller 104 across snoop bus 120. If a cache miss occurs, no further action is taken by cache controller 104. Bus master 114 completes its access of second system memory 130 without ever acquiring mastership of system bus 110. System bus 110 remains available for CPU 102 operations while bus master 114 executes an access to second system memory 130. Snoop bus 120 therefore enables simultaneous processing on local bus 112 and system bus 110.

If bus master 114's access of second system memory 130 results in a cache hit requiring a write back, alternative procedures can be followed depending upon the specific embodiment of the present invention employed. If snoop bus 120 is minimized, as depicted in FIG. 10, to provide just enough information to enable controller 104 to snoop addresses being accessed by bus master 114, data from cache memory array 105 must be written back to second system memory 130 over system bus 110 through bridge 108. Accordingly, bridge 108 would obtain mastership of system bus 110 and route the data from cache memory array 105 to second system memory 130.

Figure 6:
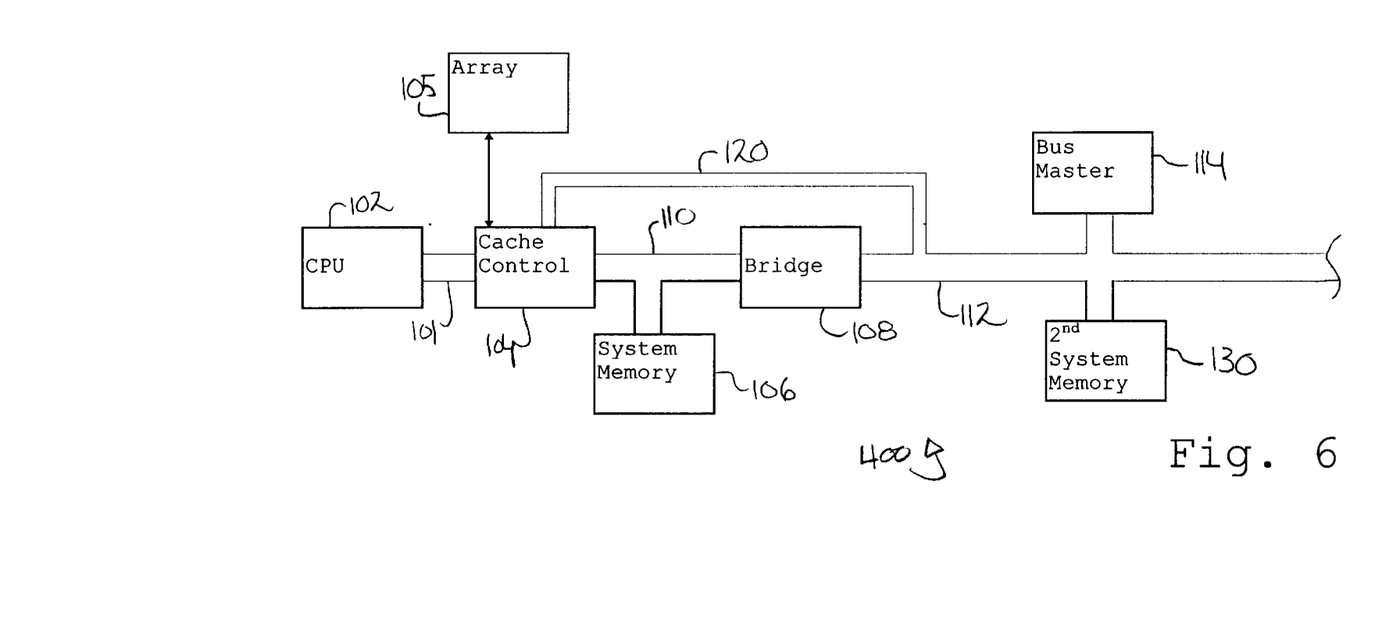
FIG. 6 is a block diagram similar to FIG. 4, further showing a bus master and a second system memory connected to the local bus.

If snoop bus 120 includes data signals as shown in FIG. 9, an access of second system memory 130 that results in a cache hit requiring a write back can be serviced directly over snoop bus 120 without acquiring mastership of system bus 110. Data from cache memory array 105 could be written back to second system memory 130 over snoop bus 120. FIG. 6 shows a system 400, similar to the system shown in FIG. 5, implemented with the look through cache configuration described.

Figure 7:
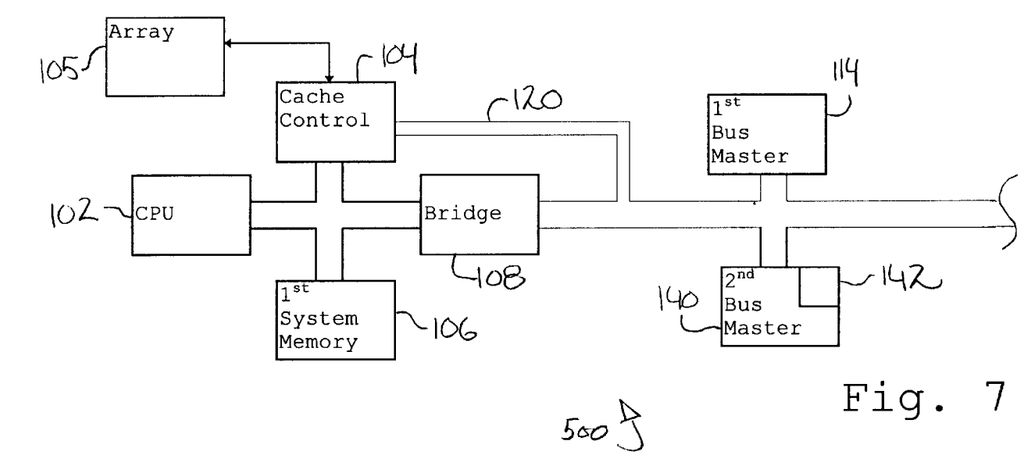
FIG. 7 is a block diagram similar to FIG. 5, showing a first bus master and a second bus master connected to the local bus, where the second bus master contains cacheable memory locations.
Figure 8:
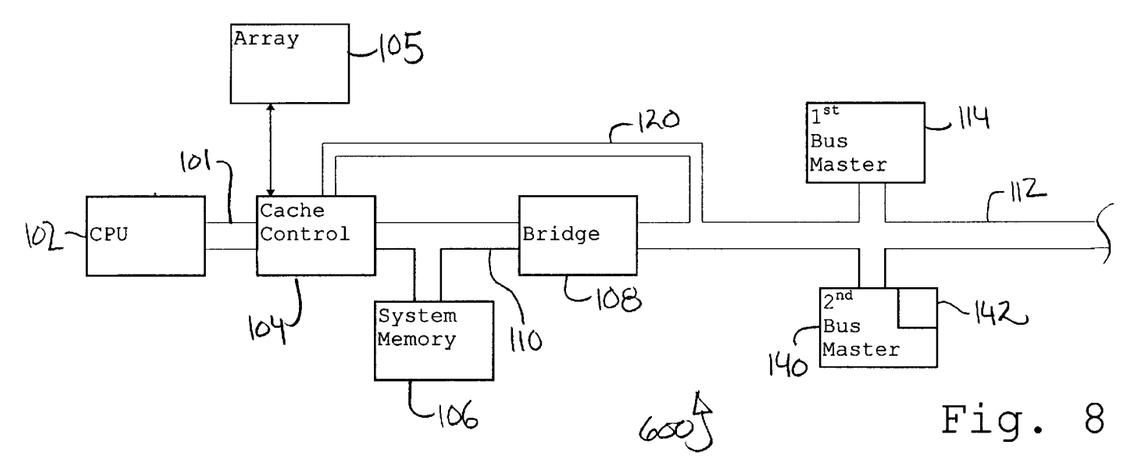
FIG. 8 is a block diagram similar to FIG. 6, showing a first bus master and a second bus master having cacheable memory locations.

FIG. 7 depicts a system 500 in which a second bus master 140 is connected to local bus 112. Second bus master 140 contains cacheable memory locations 142. Second bus master 140 could be, for example, a video display containing video memory as cacheable memory 142. The present invention permits cacheable memory to be located within second bus master 140. If first bus master 114 initiates a memory access to cacheable memory 142 within second bus master 140, the transaction is snooped by cache controller 104 across snoop bus 120. If a cache miss occurs, no further processing by cache controller 104 is required and first bus master 114's access to second bus master 140 is completed. If bus master 114's access of cacheable memory 142 results in a cache hit requiring a write back, the data within cache memory array 105 can be written back to second bus master 140 via snoop bus 120 or via system bus 110 through bridge 108, depending upon the size and structure of snoop bus 120 as described above. FIG. 8 shows system 600, similar to system 500 of FIG. 7, implemented with a look through cache configuration.

The embodiments shown are merely exemplary of a single form of numerous forms. Various modifications and changes may be made to the configurations shown as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A cache memory system comprising:

a first bus for connecting to a first bus master;

a second bus for connecting to system memory;

a bus bridge coupled to said first bus and said second bus, wherein said bus bridge is configured to provide an interface between said first bus and second bus;

a cache memory;

a cache controller coupled to said first bus, said second bus, and to said cache memory, wherein said cache controller is configured to control caching of data in said cache memory; and a central processing unit (CPU) coupled to said cache controller;

wherein the first bus master is configured to generate a first cycle on said first bus, said first cycle corresponding to an access to said system memory;

wherein said cache controller is configured to snoop said first bus to thereby detect said first cycle initiated by said first bus master, and to control a first write-back of first modified data residing in said cache memory to said system memory in response to said first cycle prior to said first cycle being driven on said second bus by said bus bridge; and wherein said bus bridge is configured to generate a second cycle on said second bus corresponding to said first cycle on said first bus following said first write-back operation.

2. The cache memory system as recited claim 1 wherein said first bus is a Peripheral Component Interconnect (PCI) bus.

3. The cache memory system as recited in claim 1 wherein said CPU is coupled to said cache controller through said second bus, wherein said cache controller maintains said cache memory as a look aside cache for said CPU.

4. The cache memory system as recited in claim 1 wherein said CPU is coupled to said cache controller through a CPU bus, wherein said cache controller maintains said cache memory as a look-through cache for said CPU.

5. The cache memory system as recited in claim 1 further comprising a second memory connected to said first bus.

6. The cache memory system as recited in claim 5 wherein said first bus master is configured to generate a third cycle on said first bus, said third cycle corresponding to an access to said second memory, wherein said cache controller is configured to snoop said first bus to thereby detect said third cycle initiated by said first bus master, and to control a second write-back of second modified data residing in said cache memory to said second memory in response to said third cycle.

7. The cache memory system as recited in claim 1 further comprising a second bus master which includes memory locations, wherein said first bus master is configured to generate a fourth cycle on said first bus, said fourth cycle corresponding to an access to said memory locations, wherein said cache controller is configured to snoop said first bus to thereby detect said fourth cycle initiated by said first bus master, and to control a third write-back of third modified data residing in said cache memory to said memory locations in response to said fourth cycle.

8. A method of controlling a cache memory array comprising:

a first bus master generating a first cycle on a first bus in order to access a system memory, wherein said system memory is coupled to a second bus;

a cache controller snooping said first bus;

said cache controller detecting said first cycle initiated by said first bus master in response to said snooping said first bus;

said cache controller controlling a first write-back of first modified data residing in a cache memory to said system memory in response to said detecting of said first cycle, wherein said controlling a first write-back of first modified data is performed prior to said first cycle being driven onto said second bus by a bus bridge;

said bus bridge generating a second cycle on said second bus corresponding to said first cycle on said first bus following said first write-back operation.

9. The method of claim 8 further comprising said cache controller maintaining said cache memory as a look aside cache for a CPU coupled to said cache controller through said second bus.

10. The method of claim 8 further comprising said cache controller maintaining said cache memory as a look-through cache for a CPU coupled to said cache controller.

11. The method of claim 8 further comprising:

said first bus master generating a third cycle on said first bus in order to access a second memory, wherein said second memory is coupled to said first bus;

said cache controller detecting said third cycle initiated by said first bus master in response to said snooping said first bus;

said cache controller controlling a second write-back of second modified data residing in said cache memory to said second memory in response to said detecting of said third cycle.

12. The method claim 11 wherein said cache controller controlling a second write-back of second modified data includes said cache controller directly writing said second modified data to said second memory through said first bus.

13. The method of claim 8 further comprising:

said first bus master generating a fourth cycle on said first bus in order to access memory locations in a second bus master, wherein said second bus master is coupled to said first bus;

said cache controller detecting said fourth cycle initiated by said first bus master in response to said snooping said first bus;

said cache controller controlling a third write-back of third modified data residing in said cache memory to said memory locations in response to said detecting of said fourth cycle.

14. The method of claim 13 wherein said cache controller controlling a third write-back of third modified data includes said cache controller directly said third modified data to said memory locations through said first bus.

15. The method of claim 8 wherein said snooping comprises comparing an address portion of said first cycle to a plurality of stored addresses within said cache controller to produce a comparison result.

* * * * *